Dec. 30, 1941.  K. RÄNTSCH  2,267,948
OPTICAL SYSTEM
Filed Feb. 23, 1937   2 Sheets-Sheet 1
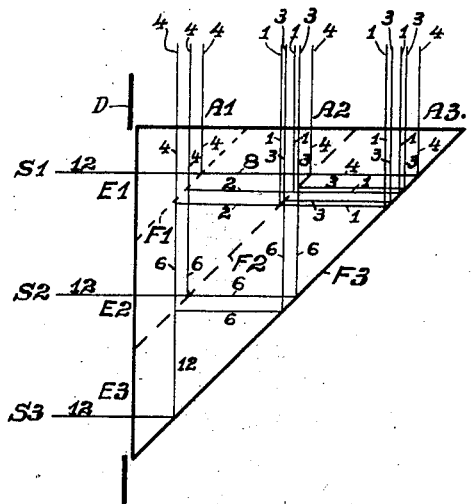
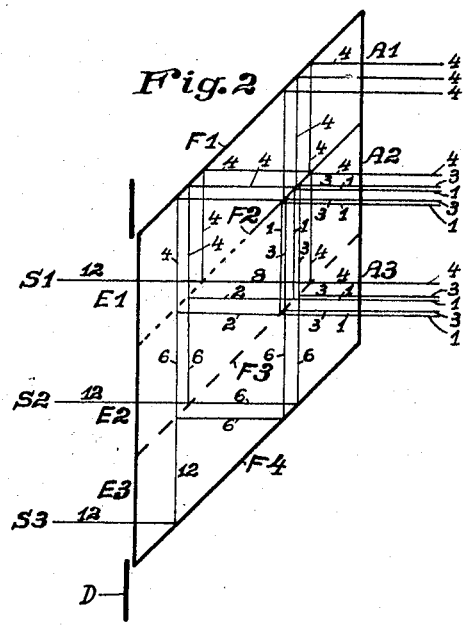
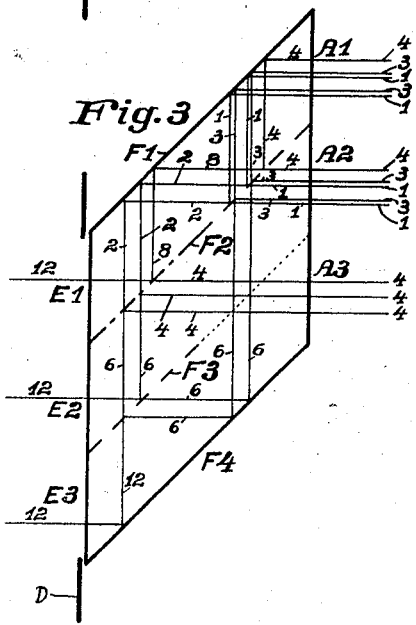
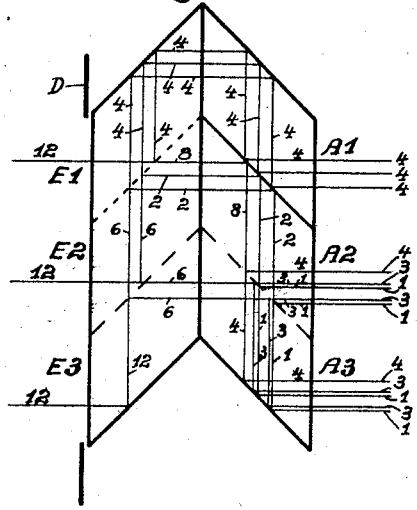

Dec. 30, 1941. K. RÄNTSCH 2,267,948
OPTICAL SYSTEM
Filed Feb. 23, 1937 2 Sheets-Sheet 2

Kurt Räntsch, Inventor
By Gifford, Scull & Burgess
Attorneys

Patented Dec. 30, 1941

2,267,948

UNITED STATES PATENT OFFICE 2,267,948

OPTICAL SYSTEM

Kurt Räntsch, Berlin-Steglitz, Germany, assignor, by mesne assignments, to Kislyn Corporation, New York, N. Y., a corporation of Delaware Application February 23, 1937, Serial No. 127,274
In Germany February 24, 1936

7 Claims. (Cl. 95—2)

My invention relates to improvements in optical systems.

When taking colored pictures to be reproduced, colored fringes occur at the edges of the objects which do not lie in the plane sharply adjusted if the inlet pupils for the single part colors are different and, therefore, produce a stereoscopical effect.

It has already been proposed to use an identical inlet pupil for all three part colors and to split up by reflection the light passing through the pupil into as many ranges as different part colors are available. Such an arrangement produces pictures which have no colored fringes in the planes not sharply adjusted but in which the individual part colors also in these planes are supplemented to give the color of the object. The arrangements hitherto known have, however, the disadvantage that, for instance, for three part colors the light passing through the inlet pupil is split up into three approximately equal parts so that only one third of the intensity is available for each color. However, in order to obtain pictures free of colored fringes a loss of light had to be put up with.

My invention has for its object to provide an arrangement in which the above-mentioned drawback is removed and in which all the light passing through the inlet pupil may be utilized with the greatest possible intensity for the production of part colors. The optical system according to the invention possesses, therefore, inlet and outlet openings of equal size. The path of rays in the system is such that both the inlet opening and the outlet opening are subdivided into a plurality of parts and that the light falling on one part of the opening passes through all parts of the other opening. If one or more objectives provided with colored filters are placed behind the parts of the outlet opening the light which had passed through all parts of the inlet opening passes through the colored filters. The pictures of different stereoscopical effect and alloted to the single parts of the filter opening supplement each other in each outlet part to an unsharpness existing also in the case of black-white pictures.

All colors have, however, the same lack of sharpness, since each filter receives light from all parts and in the same manner with the result that pictures are obtained which are even in their lack of sharpness identical and, therefore, without any colored fringes. However, care should be taken to see that the reflection be effected always on two parallel surfaces if a proper combination of the individual part beams of light is to be obtained. Also all the partially transparent surfaces must be reflective on both sides thereof. Such surfaces are preferably manufactured by the precipitation of metal, for instance, aluminum on glass, since mirrors manufactured by the chemical method are not uniformly reflective on both sides and cannot be properly polished.

Further details of my invention will be apparent from the following description taken in connection with the accompanying drawings.

In the drawings:

Fig. 1 is a diagrammatic view of an optical system showing one form in which the invention may be embodied;

Figs. 2, 3, and 4 are diagrammatic views similar to Fig. 1, but showing different embodiments of the invention;

Figure 5A:
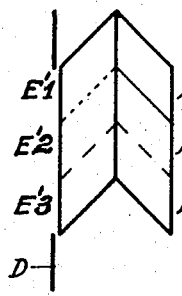
Figs. 5a and 5b are diagrammatic views of optical systems which may be used together.

Fig. 1 represents an optical system according to the invention in which the rays are deflected at right angles. The inlet opening as well as the outlet opening are divided into three parts $E_1$, $E_2$, $E_3$ and $A_1$, $A_2$, $A_3$ respectively. The reflecting surfaces $F_1$, $F_2$, $F_3$ are inclined at an angle of 45° to these parts. These surfaces are designed in such a manner that each beam of light $S_1$, $S_2$, $S_3$ passing through the parts of the inlet opening is split up into three part beams of ⅓ intensity. Thus, for instance, the beam of light $S_1$ leaves the outlet opening through the portions $A_1$, $A_2$ and $A_3$ in equal parts. The degree of reflection of the surfaces F must, therefore, be chosen in such a manner that each of the incident beams passes through all parts of the outlet opening with the same intensity. (However, it may be in some cases advantageous to select also a somewhat modified distribution of intensity.) This may be accomplished according to the arrangement shown in Fig. 1 if the surface $F_1$ reflects ⅓ of the light falling thereon and lets ⅔ pass therethrough, whereas the surface $F_2$ reflects the half of the light falling thereon and lets the rest pass therethrough. The surface $F_3$ reflects the total amount of light.

In order to follow more accurately the path of rays it is assumed that each incident beam of light possesses twelve units of luminous intensity. One third of the incident beam of light $S_1$ is reflected on the surface $F_1$ and this third, i. e., four units, leaves the light mixing body through the part $A_1$. ⅔ of the light (eight units) continue their path and are divided on the surface $F_2$ into equal portions, one of which leaves the reflecting body through the opening $A_2$ with four units, whereas the third portion after reflection on the surface $F_3$ leaves the outlet opening through the part $A_3$ also with four units.

The half of the beam of light $S_2$ is reflected (six units) on the surface $F_2$ and the other half passes therethrough. The reflected light falls on the surface $F_1$ which permits ⅔ of the incident light, i. e. four units, to pass through the part $A_1$, whereas two units fall on the surface $F_2$. This ⅙ of the original intensity is again split up into two portions so that 1/12 of the quantity of light passing through the opening $E_2$, i. e. one unit, leaves the optical system through each part $A_2$ and $A_3$. The light (six units) passing through the surface $F_2$ strikes again the surface $F_2$ after reflection on the surface $F_3$ and passes through the parts $A_2$ and $A_3$ in equal portions each of three units. Each of the parts $A_2$ and $A_3$ receives, therefore, one and three units, i. e., a total of four units or one third of the intensity $S_2$. The light passing through the part $E_2$ is, consequently, distributed in equal portions (each of four units) over the outlet parts $A_1$, $A_2$ and $A_3$.

The same applies to the incident beam of light $S_3$ as is the case with the incident beam of light $S_2$, since half the light is reflected on the surface $F_2$ so that the two beams of light are equal in intensity. Also the beam of light $S_3$ will be, consequently, distributed in equal portions over the three outlet parts. Each of these parts receives 100% of the quantity of light falling on a part of the inlet surface; the light is, however, mixed in such a manner that the light falling on each part of the inlet surface leaves the optical system through all outlet surfaces with the same percentage. The same rules for mixing the light apply to the reverse path of rays. Since the light for the parts $A_2$ and $A_3$ comes also from the total inlet opening the occurrence of colored fringes is completely avoided.

By the optical system according to the invention a proper effect may only be obtained if the light passing therethrough is telecentric. If objects are, therefore, to be photographed which are differently spaced a known focusing system must be employed with which the objects lying nearer are virtually projected at infinity.

The optical system shown in Fig. 1 presents the disadvantage in that it deviates at right angles the direction of the luminous rays. Although it is possible to depart from the right angle within certain limits it is nevertheless desirable that the incident beam be parallel to the emergent beam. This may be obtained by a totally reflecting prism which is placed on the optical system according to Fig. 1, the prism deviating at an angle of 90° the rays of light in the opposite direction. It is, however, also possible to arrange the partially reflecting surfaces forming the optical system in such a manner that the light continues in the same direction in which it fell on the optical system. Such a system is shown in Fig. 2.

The light passing through the parts $E_1$, $E_2$ and $E_3$ is again reflected partially on the surfaces $F_1$ to $F_4$ and partially passes therethrough. A portion of the light passing through the inlet opening follows a straight path in this case, whereas the remaining portion is directed to the other parts of the outlet opening by double reflection. To attain the desired effect, one of the partially reflecting surfaces $F_2$ shown in Fig. 2 cannot be uniformly reflecting over the entire extension but one half of the surface will, for instance, reflect ⅓ of the incident light, whereas the other half will reflect it completely or will allow it to pass completely therethrough. In Fig. 2 is shown the first case in which one half of the surface $F_2$ reflects the light completely. The travel of the light falling on the inlet opening is indicated by the paths of light in which the correspondingly existing portion of light (12 units) passing through the part of the inlet opening is indicated. The surface $F_1$ is as also the surface $F_4$ completely reflective, whereas the surface $F_3$ reflects the half of the incident light. As will be seen from the figure the light passing through the parts of the outlet opening comes uniformly also in this case from all parts of the inlet opening.

The embodiment shown in Fig. 2 may be modified in various manners. If the complete reflection is omitted, for instance, on the surface $F_2$ the optical system acts in the same way except that the outlet parts $A_1$ and $A_2$ are interchanged with each other.

A further form of reflection of the partially reflecting surfaces is shown in Fig. 3. The surface $F_1$ reflects the entire incident light; the surface $F_2$ reflects on one side ⅔ and on the other side ⅓; the surface $F_3$ reflects the half of the incident light on one side and on the other side it is not reflected, whereas the surface $F_4$ is so designed as to reflect the total light. From the path of rays indicated in Fig. 3 it will be seen that also such a system possesses the desired effect. The essential point is always that the light be reflected on two parallel surfaces. Particularly the losses of light during the reflection may be taken into consideration in order that all beams of light leaving the optical system have the same intensity.

It is true that the light passing through the optical system according to Figs. 2 and 3 is parallel in front of and behind the system but it is laterally displaced. In order to obtain an optical system through which the light passes without being deviated or shifted it may be assumed that the system according to Fig. 2 is cut according to a line perpendicular to the plane of the drawings and extending parallel to the inlet and outlet openings and that the halves resulting therefrom are so arranged as to mirror each other. As will be seen from Fig. 4 the light in the optical system attained in this manner follows a strictly straight line, whereas nothing has been modified as to the distribution of the single portions of the beams of light reflected by or passing through the single surfaces.

Figure 5B:
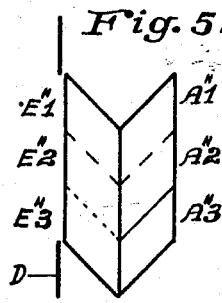
Figure 5C:
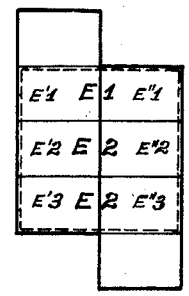
Fig. 5c is a view taken at right angles to Figs. 5a and 5b and showing those systems combined.

The rays of light passing through the optical system must traverse within the system paths of different lengths. In this manner, dominants would be caused by the non-uniform vignetting, for instance, when taking pictures on lenticulated films, which dominants manifest themselves by a single predominating color of the picture. To remove this difficulty it is preferable to divide the optical system into halves and to arrange the two symmetrical halves together in such a manner that the light leaving the outlet opening in each part has traversed in average the same path. A body according to Fig. 5a is arranged in front of one half of the outlet opening and a body according to Fig. 5b in front of the other half. Since both systems permit the passage of light without the latter being deviated or shifted they afford a uniform total inlet opening consisting of two adjacent inlet surfaces (Fig. 5c). In both system halves the "light path dominants" are of complemental colors and are compensated for if the outlet openings $A_1$, $A_2$, $A_3$ are placed in registry with the bands of a multicolor filter.

The optical system thus obtained permits a reduction of the aperture owing to the particular operation, for which each portion of the inlet surface is allotted to every three filter bands in exactly the same manner according to the luminous intensity, in which case the diaphragm must be placed in front of the optical system without reducing the outer color bands more than the inner ones as would be the case without such an optical system. In this manner both the opening and the depth of sharpness of the entire photographic system may be influenced at will.

Figure 6:
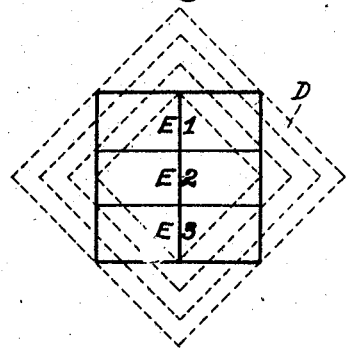
Fig. 6 is a face view of an optical system constructed according to the invention and showing its use with relation to a diaphragm.

It is possible to use a simple iris diaphragm D for reducing the aperture. It is, however, preferable to employ a square diaphragm D' whose position with respect to the optical system is shown in dotted lines in Fig. 6. The diaphragm which is, of course, placed on the inlet side of the optical system removes the same amount of light from all three bands of the outlet side. The quantity of light passing through the single color bands is, however, reduced by the use of square diaphragms as compared to the other forms in such a manner that the distribution of intensity behind the lenticular elements along the straight boundaries is never greater than in the middle of the bands.

Figure 7:
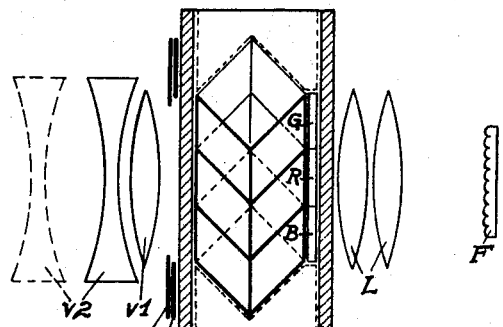
Fig. 7 is a longitudinal diagrammatic view through an optical system, of which the invention forms a part.

The novel optical system may be easily constructed if the reflecting surfaces are formed by identical rhombic prisms with parallel counter-surfaces. The opposite ends of the prisms are disposed in common planes, respectively, to form the inlet and the outlet for the optical device. The outer sides of the outer prisms form inner totally reflecting surfaces for the device, whereas the other sides of the prisms contact with each other and are so treated as to form partially transmitting and partially reflecting surfaces. For example, the ground surfaces are provided with a reflecting metal layer according to the desired transparency and may be combined to form the entire system without any considerable adjusting difficulties. In this case, it is preferable to cement the reflecting surfaces together and employ the entire system in a common tank within an immersion fluid. The filters are preferably placed together with the entire system in the tank and arranged between the wall and glass body as shown in Fig. 7. In this figure is schematically shown the system to be employed in front of an objective for taking pictures on lenticulated films. $V_1$ and $V_2$ are positive and negative parts of a focusing system, I is an adjustable diaphragm, S is a fixed diaphragm, P are closing plates of the tank, G, R, B are the single color filter bands, L is the objective proper and F the lenticulated film.

Figure 8:
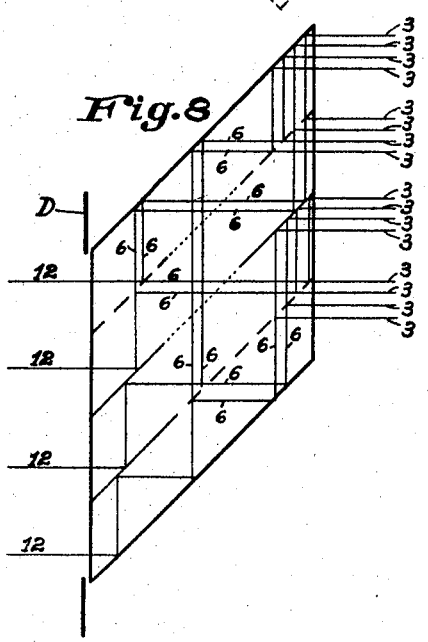
Figs. 8 and 9 are views similar to Fig. 1, but showing still other embodiments of the invention.

An optical system according to the invention is not limited to the use of exactly three inlet and outlet parts. It is, for instance, also possible to provide more or less parts according to the desired purpose. Thus Fig. 8 shows an optical system which is to be employed in an objective having four different bands, which may be, for instance, four differently colored filters for a method for taking pictures on a lenticulated film or also complementally colored filters for a method for producing colored pictures with separate pictures. The operation of the arrangement shown in Fig. 8 is apparent from the paths of rays indicated therein. The semi-transparent surfaces reflect half the light, whereas the remaining portion of the surfaces either reflects the light completely or permits the light to completely pass therethrough. Also such an optical system may be employed for the passage of light in a substantially straight path or may serve by the use of symmetrical halves to avoid light path dominants.

Figure 9:
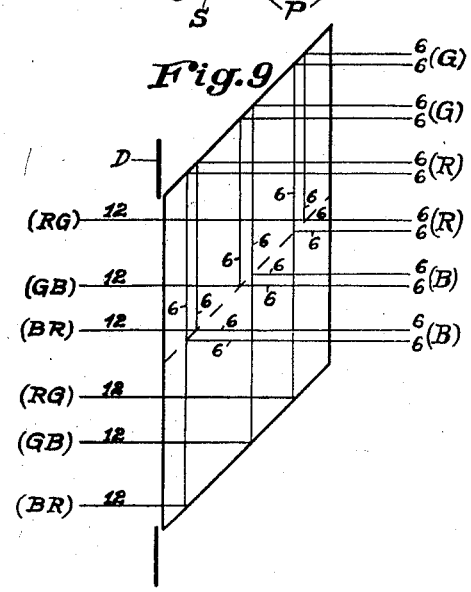

An optical system consisting only of two parts is shown in Fig. 9. The outer surfaces are completely reflective, whereas the central division surface is semi-transparent. Such a particularly simple system is advantageous, for instance, when taking pictures according to the two color method.

Such an optical system may be, however, used also for three color photography. It is true that the colored fringes are not then completely avoided, but their visibility is so considerably reduced that such a system is sufficient for a variety of purposes. The reduced visibility of the colored fringes results in the first place from the division of the strip width into two halves owing to the fact that the optical system is designed in two parts and in the second place by the fact that owing to the formation of mixed colors in the pupil not the pure primary colors, but the already strongly modified secondary colors brought about by mixing two part colors are perceived. The reduction of the colored fringes brought about by such a system corresponds consequently to a factor 4, i. e.—in the case of an aperture of the lenticulated elements of 1:2,5—to pictures taken with an objective having a relative aperture 1:10. Also such an optical system may be so constructed as to permit the passage of the light in a substantially straight path or consist of symmetrical halves for avoiding light path dominants.

I claim as my invention:

1. In an apparatus for taking color pictures upon a lenticulated film, a plural-zoned color filter in front of said film, an optical device in front of said filter and having an inlet to receive light and an outlet from which said light passes through the filter and thence to the film, said inlet and outlet each being divided into the same number of zones as said filter, and parallel light reflecting and transmitting surfaces within said device constructed and arranged to divide light entering each inlet zone into the same number of parts as there are zones in the filter and to direct one of said parts through each of said outlet zones to a corresponding zone of the filter in a path parallel to the path of light entering said inlet zones.

2. In an apparatus for taking color pictures upon a lenticulated film, a plural-zoned color filter in front of said film, an optical device in front of said filter and having an inlet to receive light and an outlet from which said light passes through the filter and thence to the film, said inlet and outlet each having substantially the same area as said filter and each being divided into the same number of zones as said filter, and parallel light reflecting and transmitting surfaces within said device constructed and arranged to divide the light entering each inlet zone into the same number of parts as there are zones in the filter and to direct one of said parts through each of said outlet zones to a corresponding zone of the filter in a path parallel to the path of light entering said inlet zones.

3. In an apparatus for taking color pictures upon a lenticuated film, a plural-zoned color filter in front of said film, an optical device in front of said filter and having an inlet to receive light and an outlet from which said light passes through the filter and thence to the film, said inlet and outlet each being divided into the same number of zones as said filter, and parallel light reflecting and transmitting surfaces within said device constructed and arranged to divide the light entering each inlet zone into the same number of parts as there are zones in the filter and to direct one of said parts through each of said outlet zones to a corresponding zone of the filter and to direct all of said parts through said outlet zones in paths parallel to each other.

4. In an apparatus for taking color pictures upon a lenticuated film, a plural-zoned color filter in front of said film, an optical device in front of said filter and having an inlet to receive light and an outlet from which said light passes through the filter and thence to the film, said inlet and outlet each being divided into the same number of zones as said filter and said inlet and outlet being disposed substantially in line with each other, and parallel light reflecting and transmitting surfaces within said device constructed and arranged to divide the light entering each inlet zone into the same number of parts as there are zones in the filter and to direct one of said parts through each of said outlet zones to a corresponding zone of the filter in a path parallel to the path of light entering said inlet zones.

5. In an apparatus for taking color pictures upon a lenticuated film, a plural-zoned color filter in front of said film, an optical device in front of said filter and having an inlet to receive light and an outlet from which said light passes through the filter and thence to the film, said inlet and outlet each being divided into the same number of zones as said filter and said inlet and outlet being disposed substantially in line with each other, and parallel light reflecting and transmitting surfaces within said device constructed and arranged to divide the light entering each inlet zone into the same number of parts as there are zones in the filter and to direct one of said parts through each of said outlet zones to a corresponding zone of the filter in a path parallel to the path of light entering said inlet zones, said optical device comprising two portions, each having substantially the same lengths of light paths therethrough, said portions being reversed with respect to each other, for the purpose set forth.

6. In an apparatus for taking color pictures upon a lenticulated film, a plural-zoned color filter in front of said film, an optical device in front of said filter and having an inlet to receive light and an outlet from which light passes through the filter and thence to the film, said device comprising a plurality of rhombic prisms having their opposite ends in parallel planes, to form said inlet and outlet respectively, and having sides contacting with each other, the outer sides of the outer ones of said prisms forming inner totally reflecting surfaces of said device, and means at said contacting sides to partially transmit and partially reflect light.

7. In an apparatus for taking color pictures upon a lenticulated film, a plural-zoned color filter in front of said film, an optical device in front of said filter and having an inlet to receive light and an outlet from which light passes through the filter and thence to the film, said device comprising a plurality of rhombic prisms having their opposite ends in parallel planes, to form said inlet and outlet respectively, and having sides contacting with each other, the outer sides of the outer ones of said prisms forming inner totally reflecting surfaces of said device, and means at said contacting sides to partially transmit and partially reflect light, said prisms being the same in number as there are zones in said filter.

KURT RÄNTSCH.